United States Patent Office 3,781,438
Patented Dec. 25, 1973

3,781,438
ARYLISOXAZOLES AS NEMATICIDES
Loren Kenneth Gibbons, Medina, N.Y., assignor to FMC Corporation, New York, N.Y.
No Drawing. Filed Mar. 27, 1972, Ser. No. 238,613
Int. Cl. A01n 9/22, 9/28
U.S. Cl. 424—272
9 Claims

ABSTRACT OF THE DISCLOSURE

Nematicidal compositions are described which have as the nematicidal component thereof an arylisoxazole of the formula:

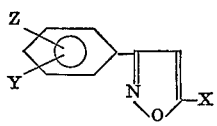

wherein X is chloro, bromo or cyano, Y is hydrogen, fluoro, chloro, bromo, cyano, lower alkyl or lower alkoxy and Z is hydrogen, chloro or methyl.

---

This invention relates to nematicides, particularly to those based on arylisoxazoles.

Nematodes are microscopic worms including several soil-dwelling species which attack commercial crop plants. According to the National Academy of Science report "Scientific Aspects of Pest Control," Publication 1402 (1966), some 500 species of nematodes are known to cause or contribute to plant diseases in North America. While not recognized to be as destructive as insects, nematodes nevertheless cause substantial damage to crops and estimates place the annual loss in the hundreds of millions of dollars. In fact, the loss may be even greater since nematode infection may go unnoticed and only in recent years have techniques become available for recognizing the true extent of nematode damage.

Nematode control measures, as practiced in commercial agriculture, generally involve treating the crop area with nematicidally active compounds, and in this connection the compounds of the present invention are very effective.

A number of types of isoxazoles have been reported to have nematicidal or anthelmintic activity. For example, Canadian Pat. 770,614 (to Ciba S.A., Oct. 31, 1967) discloses a series of 5-acylamido-3-(4-pyridyl)isoxazoles which are reported to be active against nematodes. Netherlands patent application 6818817 (to F. Bayer, Apr. 7, 1969) and its South African equivalent 68/8152 (June 18, 1969) discloses nematicidally active isoxazoles having a chlorinated methyl group at the 3- or 5-position. Halomethylisoxazoles are also reported by Sen et al. (J. Med. Chem. 9, 431 (1966)) as exhibiting anthelmintic activity against intestinal worms; however, none of the compounds were effective against oxyurid worms, a class of nematodes.

It has now been discovered that effective control of agriculturally-important nematodes can be achieved by treating the nematodes or the area to be protected against their attack with a 3-arylisoxazole of the formula:

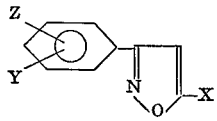

wherein X is chloro, bromo, or cyano, Y is hydrogen, fluoro, chloro, bromo, cyano, lower alkyl or lower alkoxy, and Z is hydrogen, chloro or methyl.

Some of the nematicidally active arylisoxazoles herein are known compounds but their nematicidal use has not been reported. G. Adembri and P. Tedeschi (Boll. Soc. Fac. Chem. Ind. Bologna 23 (2-3), 203–22 (1965)) describe 5-chloro-3-phenylisoxazole and 5-bromo-3-phenylisoxazole. Micetich and Chin (Can. J. Chem 48, 1371 (1970)) describe 5-chloro-3-(2-chlorophenyl)isoxazole. Micetich (Can. J. Chem. 48, 3753 (1970)) describes 5-chloro-3-(2,6-dichlorophenyl)isoxazole and 5-cyano-3-(2,-6-dichlorophenyl)isoxazole.

The synthesis of the 5-haloisoxazoles is accomplished by reaction of the appropriate β-ketoester with hydroxylamine followed by reaction of the resultant isoxazolone with phosphoryl chloride or bromide:

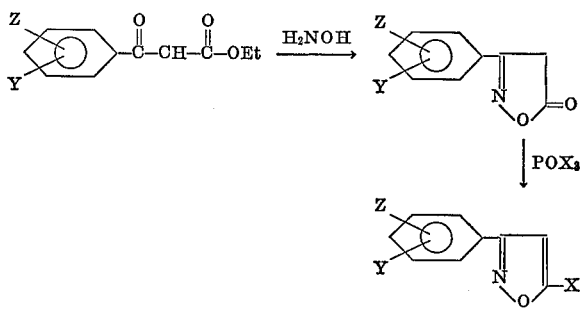

where R, X, Y and Z have the significance aforesaid.

Individual and illustrative preparations are set forth in the following examples. All temperatures are in degrees centigrade and all reduced pressures not otherwise specified are the reduced pressures normally attainable with a water aspirator.

EXAMPLE 1

Preparation of benzoylacetates

A number of the benzoylacetates employed as intermediates in the preparation of the isoxazoles of this invention have not been described previously.

(A) Preparation of ethyl (3-chlorobenzoyl)acetate: To a suspension of 10.6 g. of sodium hydride in 600 ml. of tetrahydrofuran was added 47.3 g. of diethyl carbonate. The mixture was warmed to 40° C. and 61.8 g. of 3'-chloroacetophenone was added. The mixture was stirred for 2.25 hours at ambient temperature after which 20 ml. of ethanol was added dropwise. The volatile components were removed under reduced pressure and 500 ml. of ice water was added to the residue. Sufficient benzene was added to solubilize the residue, the bisphasic system was acidified by addition of 5% hydrochloric acid and the phases separated. The aqueous phase was extracted with benzene (2× 200 ml.) and the benzene solutions combined. Benzene was removed under reduced pressure to give an oil which was distilled to give 16.4 g. of ethyl (3-chlorobenzoyl) acetate, B.P. 110–113°/0.05–0.1 mm.

(B) Preparation of ethyl (4-chlorobenzoyl)acetate: In the same manner, 4'-chloroacetophenone was reacted with diethyl carbonate to give crude ethyl (4-chlorobenzoyl)acetate. When it was found nondistillable, the oil was extracted repeatedly with 2.5% aqueous sodium hydroxide, the alkaline extracts were acidified with 5% hydrochloric acid and the acid solution extracted thrice with benzene. Concentration of the benzene extracts gave ethyl (4-benzoyl)acetate which was used without further purification.

(C) Preparation of ethyl (4-bromobenzoyl)acetate: A solution of 39.8 g. 4'-bromoacetophenone in 75 ml. of ether was added during 45 minutes to a mixture of 5.3 g. of sodium hydride and 23.6 g. of diethyl carbonate in 200 ml. anhydrous ether. The mixture was stirred for 5.5 hours at ambient temperature, an additional 100 ml. of ether was added and the mixture allowed to stand for about 60 hours. Ethanol (20 ml.) was added to destroy excess sodium hydride. The mixture was chilled and carefully poured into 500 ml. of ice water. The phases were separated, the aqueous phase acidified to pH 2–3 with 20% hydrochloric acid and extracted with ether. The ether solutions were combined and washed sequentially with water, 5% sodium bicarbonate and again with water. After drying and removal of the ether, the residual oil was distilled to give 12.7 g. of ethyl (4-bromobenzoyl) acetate, B.P. 122–125°/0.1 mm.

In the same manner were prepared:

ethyl (4-fluorobenzoyl)acetate, B.P. 110–114°/0.15 mm., $n_D^{25}$ 1.5178;
ethyl (4-methylbenzoyl)acetate, B.P. 113–116°/0.1 mm., $n_D^{25}$ 1.5350;
ethyl (4-ethylbenzoyl)acetate, B.P. 124–126°/0.1 mm., $n_D^{24}$ 1.5294;
ethyl (2,4 - dimethylbenzoyl)acetate, B.P. 119–122°/0.08–0.1 mm., $n_D^{24}$ 1.5285;
ethyl (2-methylbenzoyl)acetate, B.P. 95–98°/0.05 mm., $n_D^{25}$ 1.5295;
ethyl (3,4-dichlorobenzoyl)acetate, B.P. 143–146°/0.15 mm., $n_D^{25}$ 1.5650;
ethyl (4-ethoxybenzoyl)acetate, B.P. 150–152°/0.2 mm., $n_D^{23}$ 1.5424;
ethyl (4-propylbenzoyl)acetate, B.P. 123–127°/0.125 mm., $n_D^{23}$ 1.5268.

4'-cyanoacetophenone was reacted in the manner described above, with diethyl carbonate to obtain a red viscous residue. To this residue was added six volumes of benzene and the benzene solution was extracted with 20 volumes of 2.5% sodium hydroxide solution. The alkaline extracts were combined, filtered, acidified with 5% hydrochloric acid and the acid solution extracted with 18 volumes of benzene. The benzene extracts were dried, then concentrated and the residue triturated with hexane. From the hexane was obtained ethyl (4-cyanobenzoyl)acetate, M.P. 69–72°.

EXAMPLE 2

Preparation of 3-phenyl-2-isoxazolin-5-ones

A few of the 3-phenyl-2-isoxazolin-5-ones employed as intermediates in the preparation of the 3-phenyl-5-haloisoxazoles have been described.

(A) Preparation of 3-phenyl-2-isoxazolin-5-one: A stirred mixture of 51 g. of ethyl benzoylacetate and 33.1 g. of hydroxylamine hydrochloride in 400 ml. of ethanol was heated under reflux for 16 hours. The mixture was chilled and allowed to stand in the cold as solid separated. The precipitated solid was collected by filtration and washed with ethanol to give 15.6 g. of 3-phenyl-2-isoxazolin-5-one, M.P. 147–149°. Additional product (6.5 g., M.P. 145–150°) was obtained by concentration of the filtrate followed by dilution with hexane.

(B) Preparation of 3-(3-chlorophenyl)-2-isoxazolin-5-one: A stirred solution of 16.3 g. of ethyl (3-chlorobenzoyl)acetate in 50 ml. of ethanol and 15 ml. of water was heated to the reflux temperature and to it was added dropwise, a solution of 6.0 g. of hydroxylamine hydrochloride and 7.1 g. of sodium acetate in 20 ml. of water. The mixture was heated under reflux for 1.5 hours, then cooled in an ice-bath to precipitate a solid. The solid was collected by filtration and dissolved in 100 ml. of 2.5% sodium hydroxide. The alkaline solution was filtered, then acidified with 5% hydrochloric acid to give 4.3 g. of 3-(3-chlorophenyl) - 2 - isoxazolin-5-one, M.P. 101–103°. Grunanger and Langella, C.A. 55, 4482 (1961) report, M.P. 102–103°.

In the same manner was prepared:

3-(4-ethoxyphenyl)-2-isoxazolin-5-one, M.P. 135.5–136°;
3-(4-ethylphenyl)-2-isoxazolin-5-one, M.P. 83–84°.

(C) Preparation of 3-(4-chlorophenyl)-2-isoxazolin-5-one: A solution of 9.3 g. of ethyl (4-chlorobenzoyl)acetate in 40 ml. of not ethanol was added to a solution of 3.4 g. of hydroxylamine hydrochloride and 3.4 g. of sodium acetate in 20 ml. of water. The mixture was heated under reflux for ten minutes. The solid which precipitated from the chilled mixture was isolated to give 5.2 g. of 3-(4-chlorophenyl)-2-isoxazolin-5-one, M.P. 162–166°.

In the same manner was prepared: 3-(4-cyanophenyl)-2-isoxazolin-5-one, M.P. 137–141°.

(D) Preparation of 3-(4-bromophenyl)-2-isoxazolin-5-one: A solution of 3.7 g. of hydroxylamine and 4.5 g. of sodium acetate in 30 ml. of water was added dropwise to a solution of 12.4 g. of ethyl (4-bromobenzoyl)acetate in 50 ml. of absolute ethanol. The mixture was warmed to 40° and additional ethanol was added to obtain a clear solution. The mixture was heated under reflux for 5.0 hours. The mixture was chilled, the solid collected and recrystallized from ethanol to give 2.4 g. of 3-(4-bromophenyl)-2-isoxazolin-5-one, M.P. 173–178°.

In this manner was prepared: 3-(2,4-dimethylphenyl)-2-isoxazolin-5-one, M.P. 128–129°.

(E) Preparation of 3-(4-fluorophenyl)-2-isoxazolin-5-one: A solution of 13.9 g. of hydroxylamine hydrochloride in 34 ml. of water was added to 35.3 g. of ethyl (4-fluorobenzoyl)acetate in 168 ml. of absolute ethanol. To this mixture was added 3.4 g. of sodium hydroxide. The mixture stirred for 1.0 hour, then poured into ice water containing 1% hydrochloric acid. The precipitated solid was collected and recrystallized from hexane, then from hexane-ethanol (2:5) to give 10.3 g. of 3-(4-fluorophenyl)-2-isoxazolin-5-one, M.P. 134–136°.

In the same manner was obtained: 3-(4-methylphenyl)-2-isoxazolin-5-one, M.P. 130–132°.

(F) Preparation of 3-(2-methylphenyl-2-isoxazolin-5-one: A solution of 25.5 g. of ethyl (2-methylbenzoyl)acetate in 125 ml. of ethanol was mixed with a solution of 10.3 g. of hydroxylamine hydrochlired in 25 ml. of water and to the mixture was added 2.5 g. of sodium hydroxide. The reaction was slightly exothermic and a white solid formed. The mixture was stirred overnight at room temperature, then poured into 500 ml. of cold water. The solid was isolated, washed with cold water and dried. The filtrate and washings were extracted with benzene. The benzene extracts were washed, then concentrated to dryness. The solid products were combined and recrystallized from heptaneethanol to give 9.5 g. of 3-(2-methylphenyl)-isoxazolin-5-one, M.P. 94–94.5°.

In the same manner were prepared:

3 - (3,4 - dichlorophenyl)-2-isoxazolin-5-one, M.P. 129–131°;
3-(4-propylphenyl)-2-isoxazolin-5-one, M.P. 99–100°.

EXAMPLE 3

5-chloro-3-phenylisoxazole

To 84.3 g. of phosphorus oxychloride was added with continuous stirring 18.3 g. of 3-phenyl-2-isoxazolin-5-one. To this mixture was added dropwise during 20 minutes, 11.1 g. of triethylamine while the temperature was maintained at 0–10°. When addition was complete, the mixture was stirred at 100–120° for two hours. The volatile materials were removed under reduced pressure and the residual oil was poured into 200 ml. of ice water. The aqueous suspension was neutralized with saturated sodium bicarbonate and extracted (4× 100 ml.) with ether. The ether extracts were combined, washed with 50 ml. of saturated sodium chloride solution, dried and treated with activated carbon. The ether was removed under reduced pressure to yield 17 g. of crude product, M.P. 45–47° (Adembri and Tedesci, supra, report M.P. 51–52°). This product was purified by column chromatography on neutral alumina using a benzene-petroleum ether solvent system (500 ml. of 1:1 followed by 500 ml. of 2:1). One hundred ml. fractions of eluate were collected and the residue after removal of solvent from fractions 4–10 was sublimed, then recrystallized from petroleum ether to give white solid 5-chloro-3-phenylsoxazole, M.P. 46–48°.

Analysis.—Calc'd for $C_9H_6ClNO$ (percent): C, 60.18; H, 3.37; N, 7.80; Cl, 19.74. Found (percent): C, 59.97; H, 3.20; N, 7.68; Cl, 19.82.

EXAMPLE 4

5-bromo-3-phenylisoxazole

To a solution of 24.2 g. of 3-phenyl-2-isoxazolin-5-one and 86.8 g. of phosphorus oxybromide in 300 ml. of benzene was added 15.2 g. of triethylamine and the mixture was heated at 80° for 1.5 hours. The mixture was allowed to cool and filtered. The precipitate was washed with benzene and the filtrate and washings combined and concentrated under reduced pressure. The residue was poured onto ice, the solution neutralized with sodium hydroxide and extracted (5× 150 ml.) with diethyl ether. The ether solutions were washed with water, then dried and concentrated to give a solid. The solid was triturated with 300 ml. hot pentane, and the undissolved solid washed with pentane. The extract solution and washes were combined and concentrated to give, after recrystallization from pentane, 7.1 g. of 5-bromo-3-phenylisoxazole, M.P. 44–46° (Adembri and Tedesci, supra, report M.P. 48–50°). The IR and NMR spectra were consistent with the assigned structure.

EXAMPLE 5

5-bromo-3-(3-chlorophenyl)isoxazole

In the same manner as in Example 4, 3-(3-chlorophenyl)-2-isoxazolin-5-one was reacted with phosphorus oxybromide to give 5 - bromo-3-(3-chlorophenyl)isoxazole, M.P. 85–86°. The IR and NMR spectra were consistent with the assigned structure.

Analysis.—Calc'd for $C_9H_5BrClNO$ (percent): C, 41.81; H, 1.95; N, 5.42; Br, 30.92; Cl, 13.71. Found (percent): C, 41.71; H, 2.13; N, 5.35; Br, 28.97; Cl, 13.48.

EXAMPLE 6

5-chloro-3-(4-chlorophenyl)isoxazole

To 40 ml. of phosphorus oxychloride was added with continuous stirring 5.2 g. of 3-(4-chlorophenyl)-2-isoxazolin-5-one. The mixture was chilled and to it was added dropwise during ten minutes 2.7 g. of triethylamine. The mixture was heated under reflux for 2.0 hours, then allowed to stand overnight. The mixture was concentrated and 200 ml. of cold water was carefully added to the residue. The mixture was extracted (2× 100 ml.) of benzene, the benzene solutions were washed successively with water (2× 200 ml.), 5% sodium hydroxide (100 ml.) and with water (2× 200 ml.) The washed solutions were dried and concentrated to give 2.0 g. of golden-yellow 5 - chloro - 3-(4-chlorophenyl)isoxazole, which, after recrystallization from hexane, melted at 106–107°. The IR and NMR spectra were consistent with the assigned structure.

Analysis.—Calc'd for $C_9H_5Cl_2NO$ (percent): C, 50.51; H, 2.35; N, 6.54; Cl, 33.13. Found (percent): C, 50.33; H, 2.65; N. 6.30; Cl, 33.10.

EXAMPLE 7

5-bromo-3-(4-chlorophenyl)isoxazole

A mixture of 9.3 g. of 3-(4-chlorophenyl)-2-isoxazolin-5-one, 41 g. phosphorus oxybromide and 4.8 g. of triethylamine in 150 ml. of benzene, prepared as described in Example 6, was heated at 80° for five hours, the mixture cooled and filtered. The precipitate was washed with benzene and the benzene solutions were combined and concentrated to leave a dark-red residue. To the residue was carefully added 40 ml. of cold water and the solution was neutralized with 10% sodium hydroxide solution. The undissolved solid was collected and recrystallized from 100 ml. of ethanol to give 3.0 g. of 5-bromo-3-(4-chlorophenyl)isoxazole, which, after recrystallization again from charcoal, melted at 121–122°. The IR and NMR spectra were consistent with the assigned structure.

Analysis.—Calc'd for $C_9H_5BrClNO$ (percent): C, 41.81; H, 1.95; N, 5.42; Br, 30.92; Cl, 13.71. Found (percent): C, 41.76; H, 2.23; N, 5.22; Br, 30.72; Cl, 14.17.

EXAMPLE 8

5-bromo-3-(4-bromophenyl)isoxazole

To a cold stirred solution of 11.5 g. of phosphorus oxybromide in 35 ml. of benzene was added 2.9 g. of 3-(4-bromophenyl)-2-isoxazolin-5-one. To this solution was added dropwise with cooling during 40 minutes, 1.1 g. of triethylamine in 15 ml. benzene. The mixture was heated under reflux for seven hours, then the product was isolated as described in Example 7 to give 1.2 g. of 5-bromo-3-(4-bromophenyl)isoxazole, which, after recrystallization from hexane, melted at 127–128°. The IR and NMR spectra were consistent with the assigned structure.

Analysis.—Calcd for $C_9H_5Br_2NO$ (percent): C, 35.68; H, 1.66; N, 4.63; Br, 52.75. Found (percent): C, 35.61; H, 1.68; N, 4.81; Br, 52.58.

EXAMPLE 9

5-bromo-3-(4-fluorphenyl)isoxazole

A mixture of 49.6 g. of phosphorus oxybromide, 10.3 g. of 3-(4-fluorophenyl)-2-isoxazolin-5-one and 4.7 g. of triethylamine in 150 ml. of benzene was heated at 80° for 6 hours. The mixture was cooled in an ice-bath, filtered and the precipitate washed with benzene. The combined benzene solutions were concentrated and the residual oil carefully poured into ice. The aqueous mixture was brought to pH 8.0 with 10% aqueous sodium hydroxide. The separated solid was collected, washed with cold water and dried. The dry solid was triturated with 100 ml. of hot hexane and the hexane solution concentrated to give a yellow solid. Recrystallization from hexane gave 6.3 g. of off-white solid, M.P. 91–93°. Another recrystallization from hexane increased the M.P. to 93–94°. The IR and NMR spectra were consistent with the assigned structure.

Analysis.—Calc'd for $C_9H_5BrFNO$ (percent): C, 44.65; H, 2.08; Br, 33.02; F, 7.85; N, 5.79. Found (percent): C, 44.01; H, 1.98; Br, 32.65; F, 7.55; N, 5.81.

EXAMPLE 10

5-bromo-3-(4-methylphenyl)isoxazole

In the same manner as described in Example 9, 10.0 g. of 3-(4-methylphenyl)-2-isoxazolin-5-one was reacted with 49 g. of phosphorus oxybromide and 4.6 g. of triethylamine to give 6.8 g. of 5-bromo-3-(4-methylphenyl)isoxazole, M.P. 77–79°. The IR and NMR spectra were consistent with the assigned structure.

Analysis.—Calc'd for $C_{10}H_8BrNO$ (percent): C, 50.44; H, 3.39; Br, 33.57; N, 5.88. Found (percent): C, 49.80; H, 3.27; Br, 33.09; N, 5.87.

EXAMPLE 11

5-chloro-3-(4-methylphenyl)isoxazole

Into a chilled mixture of 5.2 g. of 3-(4-methylphenyl)-2-isoxazolin-5-one in 50 ml. of phosphorus oxychloride was slowly added 2.4 g. of triethylamine. The mixture was stirred at 100° for two hours, then allowed to stand for about 18 hours at room temperature. Volatile materials were removed under pressure and the residue treated as described in Example 9 to give, after three recrystallizations from hexane, 3.3 g. of 5-chloro-3-(4-methylphenylisoxazole, M.P. 48–49°. The IR and NMR spectra were consistent with the assigned structure.

Analysis.—Calc'd for $C_{10}M_8ClNO$ (percent): C, 62.03; H, 4.16; Cl, 18.31; N, 7.25. Found (percent): C, 61.53; H, 3.79; Cl, 17.74; N, 7.09.

EXAMPLE 12

5-bromo-3-(4-ethylphenyl)isoxazole

In the same manner as described in Example 9, 7.4 g. of 3-(4-ethylphenyl)-2-isoxazolin-5-one was reacted with 33.5 g. of phosphous oxybromide and 3.2 g. of triethylamine to give 2.5 g. of 5-bromo-3-(4-ethylphenyl) isoxazole which, after recrystallization from hexane, melted at 36–37°. The IR and NMR spectra were consistent with the assigned structure.

*Analysis.*—Calc'd for $C_{11}H_{10}BrNO$ (percent): C, 52.40; H, 4.00; Br, 31.70; N, 5.56. Found (percent): C, 52.32; H, 3.99; Br, 31.96; N, 5.44.

EXAMPLE 13

5-bromo-3-(2,4-dimethylphenyl)isoxazole

In the same manner as described in Example 9, 11.2 g. of 3-(2,4 - dimethylphenyl) - 2 - oxazolin-5-one was reacted with 51.6 g. of phosphorus oxybromide and 4.8 g. of triethylamine to give 5.5 g. of 5-bromo-3-(2,4-dimethylphenyl)isoxazole which melted, after recrystallization from hexane, at 33–35°. The IR and NMR spectra were consistent with the assigned structure.

*Analysis.*—Calc'd for $C_{11}H_{10}BrNO$ (percent): C, 52.40; H, 4.00; Br, 31.70; N, 5.56. Found (percent): C, 52.58; H, 4.25; Br, 32.00; N, 5.70.

EXAMPLE 14

3-(4-chlorophenyl-5-cyanoisoxazole

Excess chlorine gas was passed into a cold (10°) solution of 15.5 g. of 4-chlorobenzaldoxime in 200 ml. of chloroform. The solution quickly turned blue and solid began to form soon after chlorine gas introduction started. The blue gave way to green and the temperature began to fall indicating that the exothermic reaction was complete. Introduction of chlorine gas was discontinued and the mixture heated under reflux for 0.5 hour, the mixture cooled, filtered and the filtrate concentrated under reduced pressure to give a white solid. Recrystallization of the solid from hexane gave 11.5 g. of 4-chlorobenzohydroxamoyl chloride, M.P. 88–90°.

This chloride was dissolved in 115 ml. of tetrahydrofuran and to it was added slowly 5.8 g. of 2-chloroacrylonitrile. The clear solution was cooled to 10° and while maintaining the temperature at 5–10°, 6.7 g. of triethylamine was added dropwise during 10 minutes. The white slurry was stirred at ambient temperature for 4.5 hours, cooled in an ice-bath and filtered. The filtrate was concentrated and 100 ml. of cold ether was added to the residue. The ether solution was filtered and the filtrate concentrated to give 8.8 g. of waxy solid, the IR spectrum of which was consistent with that expected of 3-(4-chlorophenyl) - 5 - cyanoisoxazole. Recrystallization from ethanol gave a white solid, M.P. 130–131°. The IR and NMR spectra were consistent with the assigned structure.

*Analysis.*—Calcd for $C_{10}H_5ClN_2O$ (percent): C, 58.70; H, 2.46; Cl, 17.33; N, 13.69. Found (percent): C, 58.53; H, 2.71; Cl, 17.28; N, 13.44.

EXAMPLE 15

5-bromo-3-(2-methylphenyl)isoxazole

In the same manner as described in Example 9, 3-(2-methylphenyl) - 2 - isoxazolin - 5 - one was reacted with phosphorus oxybromide to give, after the usual isolation procedure, a dark red oil which was distilled to give 5-bromo - 3 - (2 - methylphenyl)isoxazole, B.P. 87–88°/0.1 mm. The IR and NMR spectra were consistent with the assigned structure.

*Analysis.*—Calc'd for $C_{10}H_8BrNo$ (percent): C, 50.44; H, 3.39; Br, 33.57; N, 5.88. Found (percent): C, 50.36; H, 3.66; Br, 33.53; N, 5.99.

EXAMPLE 16

5-chloro-3-(3,4-dichlorophenyl)isoxazole

A stirred mixture of 3.0 g. of 3-(3,4-dichlorophenyl)-2 - isoxazolin - 5 - one and 50 ml. of phosphorus oxychloride was cooled in an ice-bath and 1.0 g. triethylamine added dropwise thereto. The mixture was stirred at reflux temperature for three hours, unreacted phosphorus oxychloride removed by distillation under reduced pressure and the residue poured into ice. The aqueous mixture was basified with 10% sodium hydroxide. The precipitated solid was isolated on a filter, washed with cold water and dried. The dried solid was dissolved in 100 ml. of benzene, the solution washed with 2.5% sodium hydroxide solution (2× 50 ml.), then with water (2× 100 ml.). The washed solution was heated to boiling, treated with activated charcoal and filtered. Removal of the benzene left 0.7 g. of 5-chloro-3-(3,4-dichlorophenyl)isoxazole, which, after recrystallization from hexane-ethanol, melted at 120–121°. The IR and NMR spectra were consistent with the assigned structure.

*Analysis.*—Calc'd for $C_9H_4Cl_3NO$ (percent): C, 43.50; H, 1.62; Cl, 42.80; N, 5.64. Found (percent): C, 42.94; H, 1.51; Cl, 41.75; N, 5.43.

EXAMPLE 17

5-bromo-3-(4-cyanophenyl)isoxazole 3-(4-cyanophenyl) - 2 - isoxazolin - 5 - one was reacted with phosphorus oxybromide as described in Example 9. The twice recrystallized product passed through a silica gel column using diethyl ether as solvent throughout. From the eluate was obtained 5 - bromo - 3 - (4 - cyanophenyl)isoxazole, M.P. 178–179°. The IR and NMR spectra were consistent with the assigned structure.

*Analysis.*—Calc'd for $C_{10}H_{15}BrN_2O$ (percent): C, 48.21; H, 2.03; Br, 32.08; N, 11.25. Found (percent): C, 48.19; H, 2.07; Br, 31.89; N, 11.03.

EXAMPLE 18

5-chloro-3-(4-ethoxyphenyl)isoxazole

A mixture of 6.1 g. of 3-(4-ethoxyphenyl)-2-isoxazolin-5-one, 50 ml. of phosphorus oxychloride and 2.4 g. of triethylamine, prepared as described in Example 16 was heated under reflux for two hours, then allowed to stand at ambient temperature for about 18 hours. The reaction mixture was processed as described in Example 16 to give 3.6 g. of 5 - chloro - 3 - (4 -ethoxyphenyl)isoxazole which, after recrystallization from hexane, melted at 64–65°. The IR and NMR spectra were consistent with the assigned structure.

*Analysis.*—Calc'd for $C_{11}H_{10}ClNO_2$ (percent): C, 59.07; H, 4.51; Cl, 15.85; N, 6.26. Found (percent): C, 59.13; H, 4.47; Cl, 15.84; N, 6.16.

EXAMPLE 19

5-chloro-3-(4-propylphenyl)isoxazole

3 - (4 - propylphenyl) - 2 - isoxazolin -5 - one was reacted with phosphorus oxychloride as described in Example 16 to give, after recrystallizations from hexane, 5 - chloro - 3 - (4 - propylphenyl)isoxazole, M.P. 45–46°. The IR and NMR spectra were consistent with the assigned structure.

*Analysis.*—Calc'd for $C_{12}H_{12}ClNO$ (percent): C, 65.01; H, 5.46; Cl, 15.99; N, 6.32. Found (percent): C, 65.15; H, 5.17; Cl, 16.10; N, 6.23.

EXAMPLE 20

Other 5-halo-3-arylisoxazoles

In the similar manner were prepared:

(a) 5-bromo-3-(4-methoxyphenyl)isoxazole, M.P. 100–101°;
(b) 5-chloro-3-(4-methoxyphenyl)isoxazole, M.P. 81–82°;
(c) 5-bromo-3-(4-ethoxyphenyl)isoxazole, M.P. 75–76°;
(d) 5-chloro-3-(4-ethylphenyl)isoxazole, M.P. 35–36°;
(e) 5-bromo-3-(3,4-dimethylphenyl)isoxazole, M.P. 56–57°;
(f) 5-chloro-3-(2,4-dimethylphenyl)isoxazole, M.P. 38–39°;
(g) 5-bromo-3-(3-bromophenyl)isoxazole, M.P. 89–90°;
(h) 5-chloro-3-(3-bromophenyl)isoxazole, M.P. 68.5–69°;
(i) 5-bromo-3-(3-methoxyphenyl)isoxazole, M.P. 43–44°;

(j) 5-chloro-3-(3-methoxyphenyl)isoxazole, undistillable oil;
(k) 5-bromo-3-(4 - propylphenyl)isoxazole, M.P. 60–60.5°;
(l) 5-cyano-3-(3,4-dichlorophenyl)isoxazole, M.P. 147–148°;

For comparison, a set of plants are also planted in soil which has been infested with nematodes, but which received no chemical treatment.

The nematicidal activity of representative compounds of the invention is presented in Table I.

TABLE 1
Nematicidal Activity of Arylisoxazoles

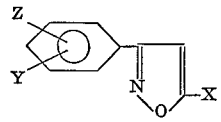

| Compound of Ex.— | X | Y | Z | Root-knot index at concentration of— | | |
|---|---|---|---|---|---|---|
| | | | | 25 p.p.m. | 10 p.p.m. | 5 p.p.m. |
| 3 | Cl | H | H | 0, 0 | 0, 0.5 | 3, 1, 4, 2 |
| 4 | Br | H | H | 0, 0 | 0.1, 0.2 | —, 2, 3, 4 |
| 5 | Br | 3-Cl | H | —, 0, 0, 0 | —, —, 0, 0 | 0.5, 0, 0.4, — |
| 6 | Cl | 4-Cl | H | 0, 0, 0.1, 0 | 0, 0, 0, 0.2 | |
| 7 | Br | 4-Cl | H | 0, 0, 0, 0 | 0, 0, 0, 0 | |
| 8 | Br | 4-Br | H | | 0, 0, 0, 0 | —, —, 0, 0.8 |
| 9 | Br | 4-F | H | | 0, 0, 0, 0 | —, 0, 0.1, 0 |
| 10 | Br | 4-CH$_3$ | H | | —, 0, 0, 0 | 0, 0, 0.2, 0 |
| 11 | Cl | 4-CH$_3$ | H | | —, 0, 0, 0 | —, 0, 0, 0 |
| 12 | Br | 4-C$_2$H$_5$ | H | 0, 0, 0, 0 | 0, 0, 0, 0 | |
| 13 | Br | 2-CH$_3$ | 4-CH$_3$ | 0, 0, 0, 0 | 0, 0.1, 0, 0.3 | |
| 14 | CN | 4-Cl | H | | 0, 0, 0, 0 | —, 1, 2, 4 |
| 15 | Br | 2-CH$_3$ | H | —, —, 0, 0 | 0, 0, 0, 0 | 3, 4, 4, 4 |
| 16 | Cl | 3-Cl | 4-Cl | 0, 0, 0, 0 | 0, 0, 0.2, 0 | |
| 17 | Br | 4-CN | H | | —, —, 0, 0 | —, 0.8, 0.8, 0 |
| 18 | Cl | 4-C$_2$H$_5$O | H | 0, 0, 0, 0 | 0.3, 0.2, 0.2, 0.1 | |
| 19 | Cl | 4-C$_3$H$_7$ | H | | 0, 0, 0, — | 0 4, 1, 1-, 1 |
| 20a | Br | 4-CH$_3$O | H | | —, 0, 0.8, 0.8 | —, 4, 4, 3 |
| 20b | Cl | 4-CH$_3$O | H | | —, —, 0.2, 0 | —, —, 4, 3 |
| 20c | Br | 4-C$_2$H$_5$O | H | 0, 0, 0, 0 | 0.5, 0.4, 0.2, 0.4 | |
| 20d | Cl | 4-C$_2$H$_5$ | H | 0, 0, 0, 0 | 0, 0.2, 0.1, 0 | |
| 20e | Br | 3-CH$_3$ | 4-CH$_3$ | 0, 0, 0, 0 | 0.4, 1-, 1-, 0.3 | |
| 20f | Cl | 2-CH$_3$ | 4-CH$_3$ | 0, 0, 0, 0 | 0.3, 0.5, 0.1, 0.5 | |
| 20g | Br | 3-Br | H | | 0, 0.1, 0.3, 0.5 | 1-, 1-, 1, 1- |
| 20h | Cl | 3-Br | H | | 0, 0.2, 0, 0.1 | 1-, 1-, 1, 1- |
| 20i | Br | 3-CH$_3$O | H | | 0.5, 0.5, 0.2, 0.8 | 1, 1-, 1, 1 |
| 20j | Cl | 3-CH$_3$O | H | | 0 1, 0, 0.2, 0.5 | —, 1-, 1, 1 |
| 20k | Br | 4-C$_3$H$_7$ | H | | 0.1, 0.3, 0.4, 0 | —, 2, 1, 1- |
| 20l | CN | 3-Cl | 4-Cl | 0, 0.2, 0, 0.5 | 1-, 1, 2, — | —, 4, 4, 4 |
| 20m | Br | 3-Cl | 4-Cl | 0, 0.2, 0, 0 | 0.5, 1-, 1-, 1 | |
| 20n | CN | 3-Cl | H | 0.1, 0.2, 0.5, — | ..Z Z ZM | |

(m) 5-bromo-3-(3,4-dichlorophenyl)isoxazole, M.P. 128–129°;
(n) 3-(3-chlorophenyl)-5-cyanoisoxazole, M.P. 107–109°.

NEMATICIDAL ACTIVITY

A nematode-infested soil was prepared by introducing the larvae and eggs of the root-knot nematode (*Meloidogyne incognita*) into sandy loam soil. Approximately 800 grams of this soil was blended with sufficient active ingredient to give the desired concentration in the soil. The active ingredient had previously been formulated into a 5% dust of the composition:

| Component: | Percent by weight |
|---|---|
| Active ingredient | 5.0 |
| Clay (attapulgite or kaolin) | 91.2 |
| Sodium lignosulfonate | 1.9 |
| Sodium lauryl sulfate | 1.9 |

After being thoroughly mixed in a mechanical blender, the treated soil was placed into three-inch flower pots. Into each pot containing chemically-treated, nematode-infested soil was planted a young tomato plant. The plantings were maintained under normal greenhouse growing conditions for about two weeks after which the roots of the plants were examined to determine the extent of gall formation. Roots of each plant were assigned a root-knot index according to the following scale:

4=no reduction in knotting (i.e. gall formation)
3=about 25% reduction in knotting
2=about 50% reduction in knotting
1=about 75% reduction in knotting
0.8 or 1-=about 80% reduction in knotting
0.5—0.1=from 95–99% reduction in knotting
0=no knots (100% reduction)

In a similar manner, corn seeds were planted in sterilized sand-loam mixture (1:1) which previously had been mixed with a 5% dust formulation of the compounds of Examples 4, 6 and 7. The treated soil was inoculated with a water suspension of the larvae and adults of the stunt nematode (*Tylenchlorhynchus claytoni*). The pots were maintained under normal greenhouse growing conditions for four weeks after which the nematodes were collected and counted. The nematodes were collected by the standard sieving technique of Caveness and Jensen (Proc. Helm. Soc. Wash. 22, 87 (1955)), using a 325 mesh sieve, followed by centrifugal flotation and resieving. The collected nematodes were counted visually using a low power microscope. Table 2 presents results of these tests.

TABLE 2
Nematicidal Activity against *T. claytoni*

| | Nematodes recovered | | | | Average | Percent reduction |
|---|---|---|---|---|---|---|
| | 1 | 2 | 3 | 4 | | |
| Compound of Ex. 4 | 110 | 71 | 91 | 93 | 91 | 34 |
| Untreated | 147 | 233 | 100 | 73 | 138 | |
| Compound of Ex.: | | | | | | |
| 6 | 540 | 520 | 1,100 | 580 | 685 | 87 |
| 7 | 380 | 880 | 540 | 700 | 625 | 88 |
| Untreated | 5,440 | 7,320 | 4,300 | 4,100 | 5,290 | |

The compounds of the invention have also shown activity against other nematode species such as the bulb and stem nematode *Ditylenchus dipsaci*, the root parasite *Aphelenchus avenae*, and the lesion nematode *Pratylenchus penetrans*.

The active chemical compounds of this invention, like most agricultural chemicals, are not usually applied full strength. They are generally incorporated with the adjuvants and carriers normally employed for facilitating dispersion of active ingredients for agricultural chemical applications, recognizing the accepted fact that the formulation and mode of application may effect the activity of the compound. The active compounds of this invention may be applied as a spray, dust or granule. They may be formulation as granules of large particle size, as powdery dusts, as wettable powders, as emulsifiable concentrates or as solutions. Preferably, they are applied dispersed on a granular carrier or as wettable powder.

In granular formulations, for example, the active compound is spread on the surface of, or absorbed into, a granular carrier may be inert or may be a fertilizer or other active material.

Wettable powders are in the form of finely-divided particles which disperse readily in water or other dispersant, this dispersability usually being enhanced by the addition of a surface-active agent. The powder may be applied to the soil either as a dry dust or preferably as a suspension in water. Typical carriers include fuller's earth, kaolins, silicas, and other highly absorbent organic diluents. Typical wetting, dispersing, or emulsifying agents used in agricultural formulation include, for example, the alkyl and alkylarylsulfonates and sulfates and their sodium salts, alkylamide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface-active agents are available in commerce. The surface-active agent when used, normally comprises from one percent to fifteen percent by weight of the nematicidal composition.

The active ingredient, when mixed with a finely ground solid such as talc, may be applied as a dust; or it may be combined with a solvent and a wetting agent in the form of an emulsifiable concentrate which is then diluted further with water for application to the soil. All of these techniques for formulating and applying active ingredients to the soil are well known in the art.

While inherently highly active and stable for extended periods at ordinary temperatures, we have found it possible to materially improve the storage stability of solid formulations by incorporating into the formulation a stabilizing agent such as an epoxidized fatty oil, for example epoxidized soybean oil, or a glycol, for example propylene glycol or epichlorohydrin. Illustrative of this stabilizing effect, a 5% dust prepared using attaplugite clay without a stabilizing agent was stored for 21 days at 25° C. The recoverable arylisoxazole content, as measured by gas chromatography, was found to have decreased 53%. The recoverable arylisoxazole content of comparable formulations to which had been added propylene glycol or epoxidized soybean oil had decreased only 2% and 8% respectively.

Typical formulations are:

Wettable powders: Percent w./w.
Active ingredient _____ 25.00
Sodium lignosulfonate _____ 1.50
Sodium alkylnaphthalenesulfonate _____ 1.50
Attapulgite clay _____ 72.00
Emulsifiable concentrates:
Active ingredient _____ 20.00
Calcium alkylbenzenesulfonate _____ 3.00
Polyalkylene glycol ethers _____ 2.00
Xylene _____ 75.00
Dusts:
Active ingredient _____ 5.00

Wettable powders: Percent w./w.
Sodium lignosulfonate _____ 1.90
Sodium alkylbenzenesulfonate _____ 1.90
Attapulgite clay (325 mesh) _____ 91.20
Granules:
Active ingredient _____ 15.15
Isophorone _____ 15.15
Attapulgite clay (24/48 mesh) _____ 69.70

Typical preferred dust formulations are:

(A):
Active ingredient _____ 5.00
Sodium lignosulfonate _____ 1.90
Sodium alkylbenzenesulfonate _____ 1.90
Attapulgite clay (325 mesh) _____ 88.70
Propylene glycol _____ 2.50

(B):
Active ingredient _____ 5.00
Sodium lignosulfonate _____ 1.90
Sodium lauryl sulfate _____ 1.90
Attapulgite clay (325 mesh) _____ 88.70
Epoxidized soybean oil _____ 2.50

The rate of application of the active ingredient to the soil may be, for example, in the range of about 0.2 to 50 pounds per acre, and the concentration of the active ingredient in the soil may be, for instance, in the range of about 0.1 to 100 p.p.m. The active ingredients described herein have been found to have high nematicidal actiivty even at low concentrations.

What is claimed is:

1. A method of controlling nematodes which comprises contacting the nematodes with a nematicidal amount of a compound of the formula:

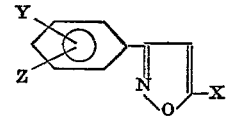

where
X is Cl, Br or Cn;
Y is H, halogen, lower alkyl of 1 to 3 carbon atoms, lower alkoxy of 1 to 2 carbon atoms or cyano; and
Z is H, chloro or methyl.

2. The method according to claim 1 wherein X is Br and Z is H.

3. The method according to claim 1 wherein X is Cl and Z is H.

4. Thhe method according to claim 1 wherein the compound is 5-chloro-3-phenylisoxazole.

5. The method according to claim 1 wherein the compound is 5-bromo-3-phenylisoxazole.

6. The method according to claim 1 wherein the compound is 5-bromo-3-(3-chlorophenyl)isoxazole.

7. The method according to claim 1 wherein the compound is 5-chloro-3-(4-chlorophenyl)isoxazole.

8. The method according to claim 1 wherein the compound is 5-bromo-3-(4-chlorophenyl)isoxazole.

9. The method according to claim 1 wherein the compound is 5-bromo-3-(4-bromophenyl)isoxazole.

References Cited

Micetich et al.: Can. J. of Chem. 48, 1371–76 (1970).
Micetich: Can. J. of Chem. 48, 3753–55 (1970).
Sen. et al.: J. Med. Chem. 9, 431–433 (1966).
Adembri et al.: Chem. Abst. pp. 13, 234–5 (vol. 63 (1965).
Micetich: Chem. Abst. pp. 12, 5, 531H Chem. Abst. vol. 74, (1971).

STANLEY J. FRIEDMAN, Primary Examiner

A. J. ROBINSON, Assistant Examiner

UNITED STATES PATENT OFFICE
CERTIFICATE OF CORRECTION

Patent No. 3,781,438      Dated December 25, 1973

Inventor(s) Loren Kenneth Gibbons

It is certified that error appears in the above-identified patent and that said Letters Patent are hereby corrected as shown below:

Column 3, line 72, "not" should read --hot--.

Column 4, line 42, "isoxazolin" should read --2-isoxazolin--.

Column 6, line 66, "$C_{10}M_8ClNO$" should read --$C_{10}H_8ClNO$--.

Column 6, line 67, "N, 7.25." should read --N, 7.24.--

Column 10, Table I, last item under 10 ppm, "ZZZM" should be omitted.

Column 10, Table I, under 5 ppm, Compound 19, "04,1,1-,1" should read --0.4,1,1-,1.

Signed and sealed this 17th day of June 1975.

(SEAL)
Attest:

RUTH C. MASON
Attesting Officer

C. MARSHALL DANN
Commissioner of Patents
and Trademarks